UNITED STATES PATENT OFFICE.

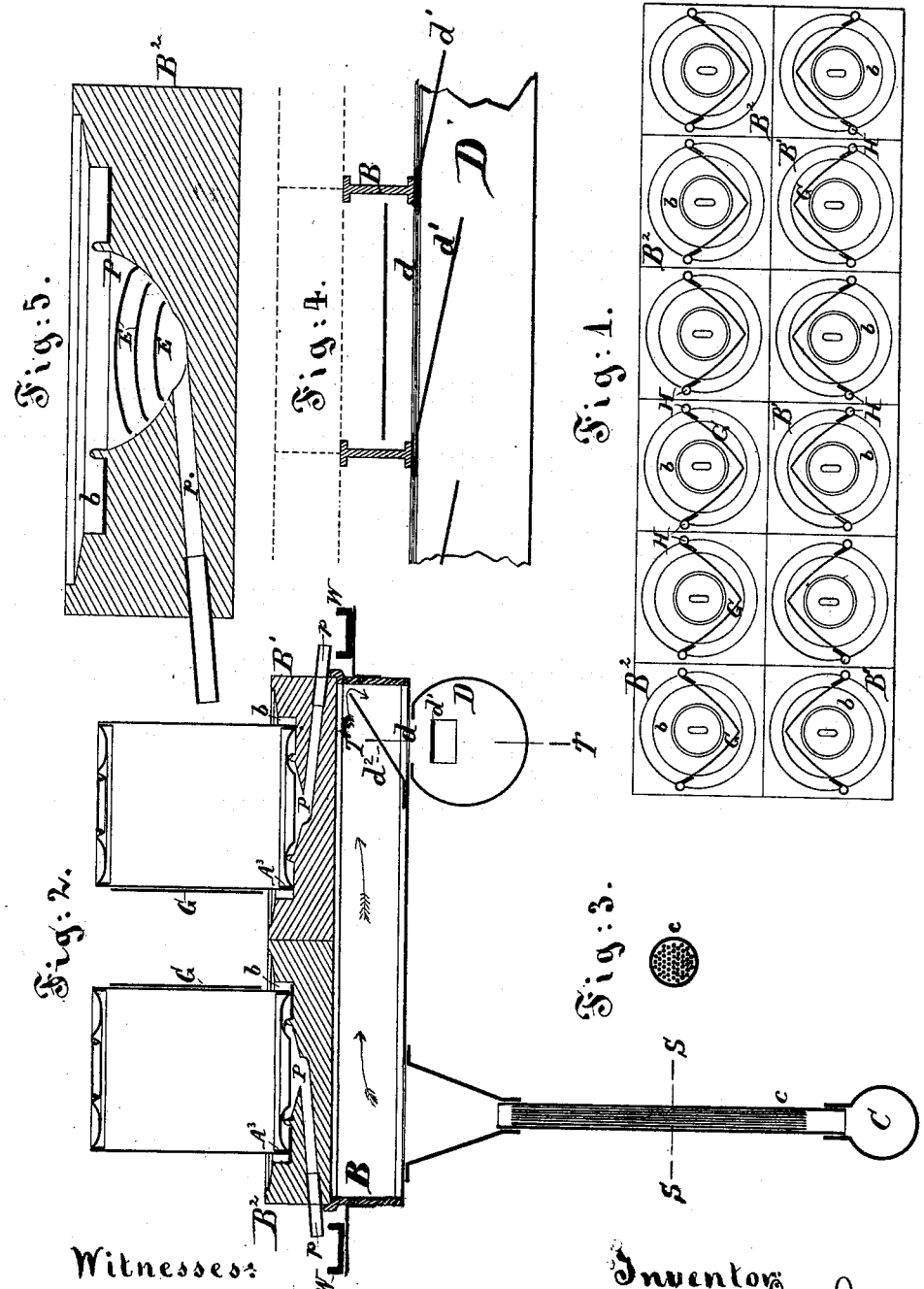

AZEL S. LYMAN, OF NEW YORK, N. Y., ASSIGNOR TO HIMSELF AND WATTS, PARKER & CO., OF SAME PLACE.

IMPROVEMENT IN SOLDERING APPARATUS.

Specification forming part of Letters Patent No. 195,622, dated September 25, 1877; application filed June 21, 1877.

*To all whom it may concern:*

Be it known that I, AZEL S. LYMAN, of New York city, in the State of New York, have invented certain new and useful Improvements relating to Soldering Apparatus, of which the following is a specification:

I have devised a form of can adapted for canning meats and other articles, in which the ends are recessed quite around just within their peripheries or rims. In other words, supposing the can to stand on end on a table or other flat support, the bodies extend down to the table, but the end is drawn upward immediately within the periphery. This form affords peculiar facilities for soldering by immersion of the rim or outer edge of the end in melted solder, without smearing with the solder or flux any but a very narrow line.

My improved soldering apparatus is intended for soldering such cans and analogous articles adapted to be similarly soldered.

The melted solder is contained in sunk recesses in properly-heated pans or castings of suitable form, which I will term "plates." The recess for the solder extends continuously around. There is another recess in the middle of each plate, where the solder is prevented from flowing, except by accident, and which is covered with several thin shields to reduce the radiation of heat. I provide a passage extending obliquely downward from the central recess, which allows any solder which arrives there to flow readily away. This oblique passage also allows ingress and egress of the air in applying and removing the cans.

I apply together a number of these plates, arranged in two rows, with their discharge-spouts presented outwardly. One side of the set is used for soldering, the recesses first referred to being kept supplied with melted solder. The other side is used for fluxing, the recesses being supplied with a suitable flux to promote the subsequent soldering.

The heat for maintaining the solder in a melted condition may be applied by a fire below the soldering-plates, and the products of combustion, after having imparted their first heat to the soldering apparatus, are allowed to flow laterally to the other side, where the proper recesses in the pans contain melted tallow instead of solder.

Figure 1 is a general plan view, on a small scale, of a set composed of six fluxing and six soldering plates. Fig. 2 is a vertical section through my improved soldering apparatus, showing it in use in fluxing and soldering my cans. Figs. 3 and 4 represent sections through parts of the apparatus. Fig. 3 is a section, on a larger scale, on the line S S in Fig. 2, and Fig. 4 is a section through the horizontal escape-flue, which conveys away the products of combustion. It is on the line T T in Fig. 2. Fig. 5 is a vertical section through one of the soldering-plates on a large scale, showing the shields which arrest the heat.

Similar letters of reference indicate like parts in all the figures.

$B^1$ $B^2$ are castings or plates, mounted on a suitable supporting-frame, B, and heated by a flame produced by the combustion of a mixture of air and gas, previously prepared, and supplied, at suitable pressure, from a main, C, through upright pipes $c$, which, to guard against accident, are equipped with one or more screens of wire-gauze, or, preferably, are filled with upright wires laid closely side by side, as shown.

All the plates $B^1$ $B^2$ are alike; but the series $B^1$ are arranged in positions the reverse of the series $B^2$, so that their discharge-spouts $p$ are all directed outward. Each has a continuous recess, $b$, of the same outline as the end of a can. The bottoms of the recesses in the soldering-plates $B^2$ are lined with copper.

The pipes $c$ are under the soldering side $B^2$ of the apparatus. The combustion induces an intense heat on that side of the apparatus. The partially-cooled products of combustion flow from under the plates $B^2$ to the other side, imparting less heat to the plates $B^1$. The gases finally escape through the continuous pipe D, to which they are inducted through openings $d$, shielded by the deflecting-wings $d^1$, as indicated in Figs. 2 and 4. The pipe D leads to a chimney, (not represented,) through which they are discharged.

There may be further deflectors, $d^2$, at will, if desired. The pipe D may be mainly below the hot-air chamber, in which the products of combustion play against the plates $B^2$ $B^1$; or it may be altogether in it, as preferred.

In operation a can formed as shown is placed on end on one of the fluxing-plates B¹, with its rim immersed in the melted tallow in its recess $b$, and allowed to remain there for a half minute or thereabout. It is then transferred and allowed to stand for a little period in a corresponding position on a soldering-plate, B², and is then removed and allowed to cool.

As each can is placed in position on one of the castings B¹ or B², and the rim at its base commences to be immersed in the recess $b$, the air under the central portions of its base cannot escape past the rim, and is liable, by its compression, as the can is lowered down into the grease or solder, and as the air becomes expanded by heat, to cause a bubbling or disturbance, unless some special provision is made for the escape of the air. I therefore sink the center, as shown by P, covering it by one or more loosely-fitted shields of thin metal, E, (see Fig. 5,) so applied that there are ample spaces along their edges for fluids to flow past and make underneath a passage leading therefrom to the open air, as shown by $p$. This allows the air to flow out freely when the can is applied, and also to flow in freely when the can is again lifted in the act of removal.

Thus, when a can is lowered suddenly down into the solder or the tallow, the air caged below, can flow out freely through the passage $p$, and when the can is lifted again the air can flow in freely through the passage $p$ to fill the vacuum formed by the sudden lifting of the large area of the bottom.

The passages $p$ also serve another important function. They incline downward, and in case any of the tallow or solder filling the recesses $b$ spills over into the central recesses P, it will be led away through the proper passage $p$, and be conducted to the proper pan W.

To facilitate the placing of the cans correctly in the bath, I provide guides G, of sheet metal, formed and mounted, as represented, so as to partially inclose the can when in position. The cans may be applied with rapidity and dash by a skillful operator, the cans being successively pressed backward into their guides G, and thrust downward into their respective baths in the proper recesses $b$, without necessitating any care to insure their exact position or to avoid splashing.

I prefer to have as many burners or upright gas-pipes $c$ as there are soldering-plates B². In such case one burner $c$ should be under the center of a corresponding soldering-plate or casting, B².

The passages $d$ for receiving the spent products of combustion into the discharge-flue D should be under or immediately adjacent to the center of the corresponding fluxing-plate B¹. A single attendant can run a bench of six or more soldering-plates with a corresponding number of fluxing-plates, applying the fresh cans in succession in their several positions on the fluxing-plates, then shifting them in succession upon the soldering-plates, and then removing them successively therefrom upon a suitable revolving table or cooler.

The upper end of the can, having the ordinary central opening for filling, should be generally soldered first. A boy, with this apparatus, can solder eight or ten heads per minute with great perfection, allowing each head to stand half a minute in the melted solder. The inner edges of the surfaces to be soldered are above the level of the solder, so that the melted metal, being supplied thereto by capillary attraction alone, does not flow out upon the interior of the body beyond the edges of the lips A³.

Any other proper flux may be used instead of tallow; but my experiments indicate beef-tallow to be preferable. When tallow is used as a flux in meat-cans, they may be left uncleaned, and the tallow adhering is no disadvantage.

I attach importance to the fact that the soldering-recesses $b$ and the corresponding recesses for fluxing are shallow, and that the apparatus holds the cans up while being fluxed and soldered without allowing them to touch the rims of the recesses $b$. It is necessary, for obvious reasons, to make these rims very low. If the cans are allowed to rest on those rims, they will suck up the tallow and the solder by what is generally known as capillary attraction, and will cause it to flow over into the internal or central recess P. By holding the cans up entirely out of contact with the rims which form the divisions between the recesses $b$ and the recesses P, I am able to work with the annular recesses $b$ full, almost or quite up to the top of the dividing-rim, without any overflow.

I also attach importance to the lateral direction given to the passages $p$. They lead any spilled solder or flux directly away from the vicinity of the fire.

Some parts of this invention may be useful without the others. Thus the duplicate sides of the apparatus, one for fluxing and the other for soldering, with or without the provisions for more intensely heating the latter, may be useful alone. So, also, the central recess and a passage, $b$, communicating therewith, as shown, may be useful in a soldering or fluxing apparatus with or without the other parts.

Various modifications may be made by any good mechanic. Thus, other means of heating than a gas-flame, and other means of taking away the products of combustion, may be employed without entirely defeating the object of the invention.

Instead of making the plates separately and uniting them by a frame, B, two, or the whole, may be cast together. Instead of mixing the air and gas previously, and supplying it through a single main, C, the air may be supplied through one pipe and the gas through another.

Instead of making the shields E of thin metal in one or more thicknesses, I can use clay or other slow conductor of heat; and, if necessary to avoid too highly heating the center of the can so as to cause blisters thereon, I can provide a small tube to conduct a blast of cold air in through the passage P $p$ up against the can-bottom, or against the uppermost shield, allowing the air to escape through the remainder of the passage P $p$.

I claim as my invention—

1. The soldering or fluxing plates $B^1$ $B^2$, formed with shallow recesses $b$, in combination with guides G, adapted to compel a vertical motion in applying and removing the cans, and allow the recesses $b$ to remain filled without overflowing, as herein specified.

2. The soldering apparatus described, having the fluxing-plates $B^1$, receiving the spent products of combustion from the contiguous plates $B^2$, as herein specified.

3. In connection with a soldering-plate, $B^2$, adapted to be heated and kept evenly heated, as shown, the heat-shields E, in combination with the central recess or sink P, conduit $p$, and solder-recess, as herein specified.

4. The discharge-pipe D, having apertures $d$ and deflectors $d'$, in combination with the heating-plates $B^2$ $B^1$, adapted for inducting the partially-cooled products of combustion from the latter, as herein specified.

In testimony whereof I have hereunto set my hand this 20th day of June, 1877, in the presence of two subscribing witnesses.

AZEL S. LYMAN.

Witnesses:
A. HENRY GENTNER,
H. A. JOHNSTONE.